(12) United States Patent
Fargeon et al.

(10) Patent No.: US 12,445,403 B2
(45) Date of Patent: Oct. 14, 2025

(54) MESSAGE BROKER HANDLING FOR MULTIPLE MICROSERVICE APPLICATION VERSIONS

(71) Applicant: SAP SE, Walldorf (DE)

(72) Inventors: Armand Fargeon, Antibes (FR); Fabrice Diaz, Peymeinade (FR); Luc Margaron, Valbonne (FR); Julien Lapalus, Le Rouret (FR)

(73) Assignee: SAP SE, Walldorf (DE)

( * ) Notice: Subject to any disclaimer, the term of this patent is extended or adjusted under 35 U.S.C. 154(b) by 331 days.

(21) Appl. No.: 18/232,205

(22) Filed: Aug. 9, 2023

(65) Prior Publication Data
US 2025/0055825 A1    Feb. 13, 2025

(51) Int. Cl.
*H04L 51/56* (2022.01)
*G06F 8/71* (2018.01)

(52) U.S. Cl.
CPC ............. *H04L 51/56* (2022.05); *G06F 8/71* (2013.01)

(58) Field of Classification Search
CPC .................................. H04L 51/56; G06F 8/71
See application file for complete search history.

(56) References Cited

U.S. PATENT DOCUMENTS

| 11,588,776 B1* | 2/2023 | Sorenson, III | H04L 51/226 |
| 2008/0091837 A1* | 4/2008 | Langen | H04L 65/1104 709/230 |
| 2024/0098152 A1* | 3/2024 | Ramchandran | G16B 50/30 |

* cited by examiner

*Primary Examiner* — Viet D Vu
(74) *Attorney, Agent, or Firm* — SCHWEGMAN LUNDBERG & WOESSNER, P.A.

(57) ABSTRACT

A solution is provided to ensure that messages in a message broker are handled by one and only one version of a microservice application despite there being multiple versions of the microservice application running in parallel. More particularly, one version of the microservice application is designated as the leader while the others are designated as followers. When a follower has a tenant that is then promoted to be handled by the leader via a tenant assignment change, a specialized process is started by the leader that determines the current offset with the offset where the follower stopped handling messages for that tenant. If the current offset is greater, then a specialized rewind operation is performed to process any unprocessed events from the gap. If the current offset is less or equal, then a specialized fast-forward operation is performed to discard the messages addressed to the promoted tenants on the follower.

20 Claims, 14 Drawing Sheets

MESSAGE BROKER HANDLING FOR MULTIPLE MICROSERVICE APPLICATION VERSIONS

TECHNICAL FIELD

This document generally relates to computer systems. More specifically, this document relates to message broker handling for multiple microservice application versions.

BACKGROUND

A message broker is software that enables applications, systems, and services to communicate with each other and exchange information. Message brokers can be used for asynchronous communication using a publish/subscribe model. In this message distribution pattern, the source of each message publishes the message to a topic at the message broker, and multiple message consumers subscribe to topics from which they want to receive messages. All messages published to a topic are distributed to all the applications subscribed to it.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
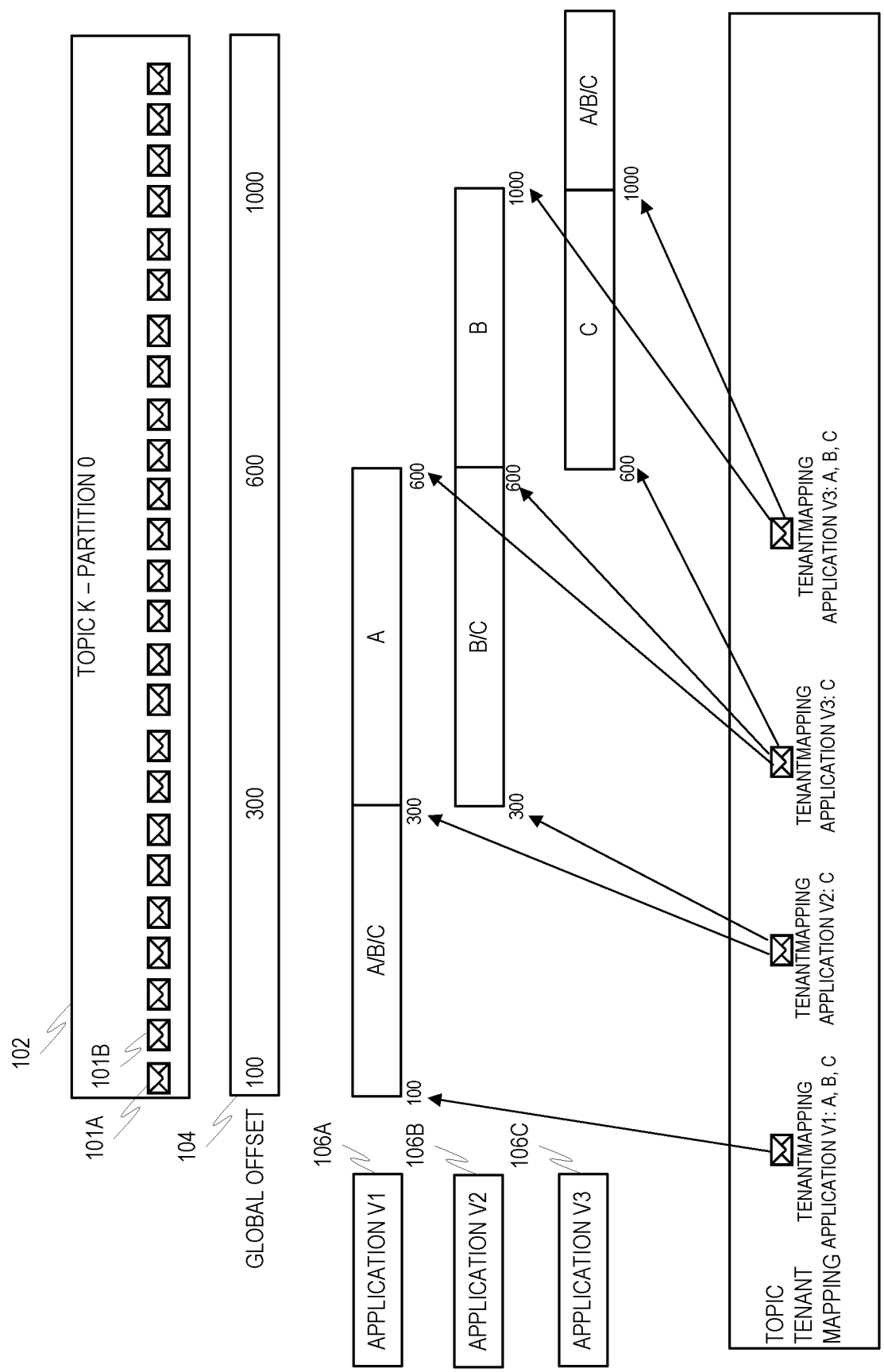
FIG. 1 is a diagram illustrating changes in tenant assignments for different versions of a microservice application, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Message brokers may be used in a cloud environment to enable enterprise event monitoring. An event is a data record expressing a change in a state and its surrounding context. Typically events contain at least two types of information: the event data representing the occurrence and context metadata providing contextual information about the occurrence. Events are routed from an event producer (the source) to interested event consumers, using a message broker.

Complex software applications are nowadays often implemented in a distributed way as a set of microservices. The respective microservices perform respective tasks of the application, and can be deployed in many different ways, e.g., on different physical devices, on different cores of the same device, or even all on the same core of a single device. Some of the microservices may provide "capabilities", that is, user-facing functionality of the application, whereas other microservices may provide internal functionality that is used by other microservices. Moreover, the microservices may consume reuse services provided by external software.

The different microservice are different processes that communicate with each other not as a monolithic software application by directly invoking each other's APIs within a single executable process, but using a different communication mechanism, e.g., by using a message-passing functionality such as a message bus, a message queue, or a service mesh. In addition to internally communicating with each other and consuming each other's functionality, the microservices may also consume functionality provided by reuse services external to the software application. Such reuse services may be used by multiple software applications and can include, e.g., a logging service, a database service, and/or a storage service, and the like.

The distributed software application can be deployed in various ways, e.g., different microservices can each run on a different device, or some or all microservices can run on a single device; respective devices can all be operated within the same data center; or the devices may be distributed among multiple data centers, possibly in different countries. A single microservice can run on multiple devices, e.g., in a replicated way to improve its resilience or throughput. How the application is deployed exactly depends on several factors, in particular its load. For example, a distributed software application may initially be deployed on a single physical device but may, as its load increases, be deployed on more and more different devices.

As microservice applications evolve over times, there is a need to create updated versions of the microservice applications for distribution. In some instances it may be beneficial to allow different versions of the same microservice application to be message consumers simultaneously for the same message broker topic. Examples of such instances include testing a new version of a microservice application for a subset of tenants while allowing the old version of the microservice application to continue to run for the remainder of tenants, handling a scenario where a tenant fails during schema migration (necessitating keeping the last working microservice application version), and dedicating a microservice version specifically for a subset of tenants.

When operating a system where multiple versions of the same microservice application run as message consumers simultaneously for the same message broker topic, there are a number of technical problems that are introduced. First, it is important to ensure that each message is processed only once by a single version of the microservice application, even if multiple versions are running in parallel, to avoid data inconsistencies. Second, it is important that all messages are processed by some version of the microservice application (i.e., no messages are missed).

Each version of a microservice application consumes messages at its own pace and accepts or discards a message according to the tenants it supports. The list of supporting tenants, however, can be updated at any point, for all microservice application versions. This makes it difficult to ensure that each message is processed once and only once by some microservice application, as a version of a microservice application can be stuck and not process a new tenant assignment. In other words, the technical problems are quite challenging when tenant assignment changes are made.

FIG. 1 is a diagram illustrating changes in tenant assignments for different versions of a microservice application, in accordance with an example embodiment. Here, messages, such as messages 101A, 101B and so on are posted sequentially to topic K 102 in partition 0. In this figure, changes in time are depicted from left to right, so message 101A is posted prior to message 101B. A global offset 104 tracks the passage of time in the system. Here, the microservice application may have three versions, 106A, 106B, 106C, each deployed at different times. Application v1 106A may be deployed at or prior to global offset 100, Application v2 106B may be deployed at offset 300, and Application v3 106C may be deployed at offset 600.

Also depicted are tenant assignments. At global offset 100, Application v1 106A is assigned tenants A, B, and C. At global offset 300, Application v2 106B is deployed and assigned tenants B and C, meaning that Application v1 106A is still assigned tenant A. At global offset 600, Application v3 106C is deployed and assigned tenant C, meaning that Application v1 106A is still assigned tenant A and Application v2 106B is still assigned tenant B. At global offset 1000, the tenant assignment is updated so that Application v3 106C is assigned all tenants (A, B, and C), meaning that Application v1 106A and Application v2 106B are not assigned any tenants from that time forward.

Problems occur when one of the applications lags over the other. In this figure it appears that no lag exists between the applications, but in real-world scenarios that is rarely the case. If, for example, Application v1 106A is lagging behind Application v2 106B, then it may be that when Application v3 106C is deployed at global offset 600, Application v1 106A has only processed messages (for tenant A) up to global offset 500, leaving a gap between global offset 500 and global offset 600 where tenant A's messages have not yet been processed, meaning that unless a solution is found, those messages would have been missed.

Alternatively, if, for example, Application v3 106C is lagging behind Application v2 106B, then it may be that when Application v3 106C is reassigned to tenants A, B, and C at global offset 900, Application v2 106B has processed messages up to global offset 1000, meaning that those messages between global offset 900 and global offset 1000 that are meant for tenant B will be processed twice (once by Application v2 106B until it ceases processing at global offset 1000 and once by Application v3 106C).

A solution is provided to ensure that messages in a message broker are handled by one and only one version of a microservice application despite there being multiple versions of the microservice application running in parallel. More particularly, one version of the microservice application is designated as the leader while the others are designated as followers. When a follower has a tenant that is then promoted to be handled by the leader via a tenant assignment change, a specialized process is started by the leader that compares the current offset with the offset where the follower stopped handling messages for that tenant. If the current offset is greater, then a specialized rewind operation is performed to process any unprocessed events from the gap. If the current offset is less or equal, then a specialized fast-forward operation is performed to discard the messages addressed to the promoted tenants on the follower.

Figure 2:
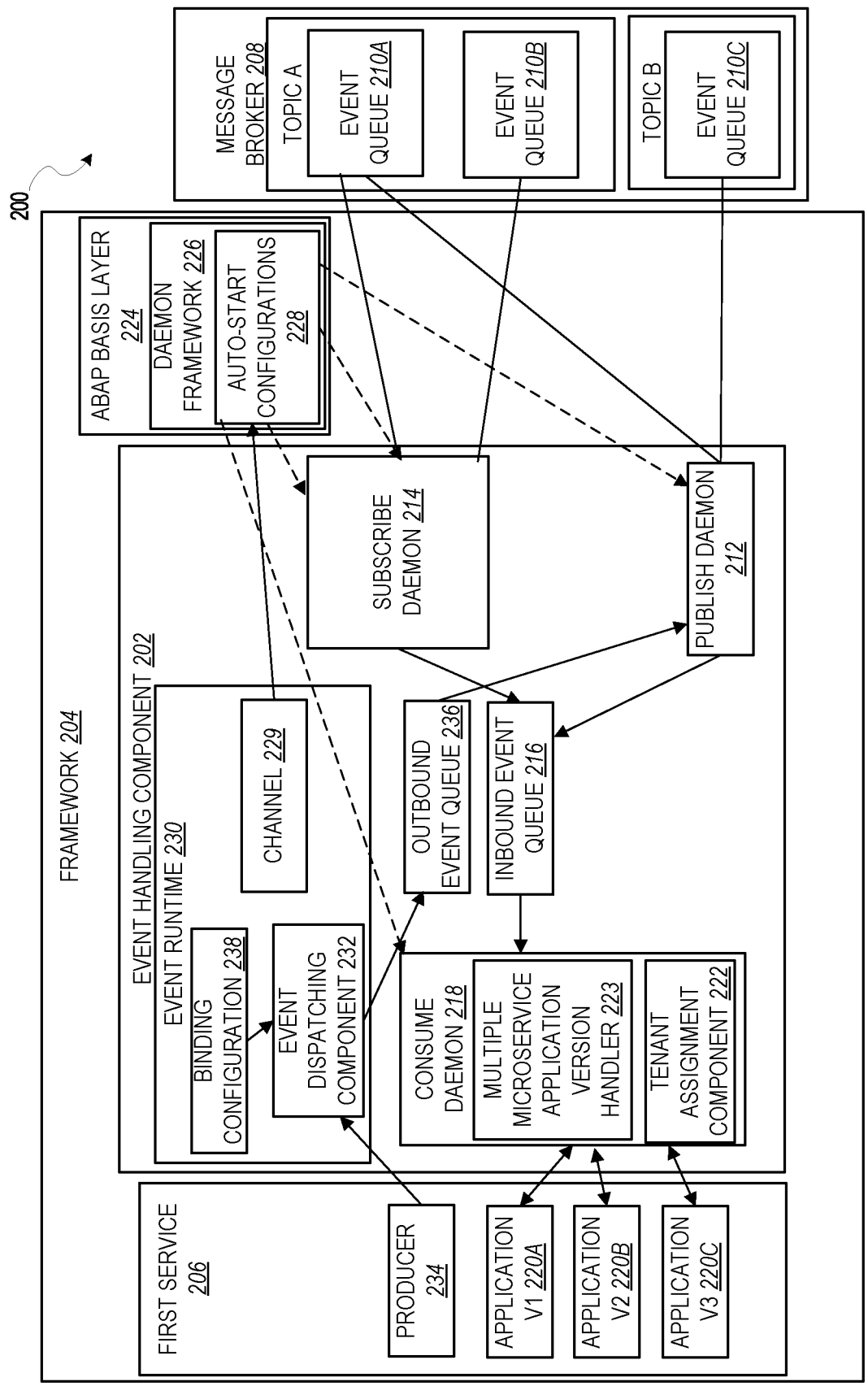
FIG. 2 is a block diagram illustrating a system, in accordance with an example embodiment.

FIG. 2 is a block diagram illustrating a system 200, in accordance with an example embodiment. An event handling component 202 may reside within a framework 204, such as an ABAP framework. A first service 206 may intend to produce and consume events to and from a message broker 208, but rather than communicate directly with the message broker 208, the first service 206 communicates with the event handling component 202, which manages the events.

Other services communicate directly with the message broker 208. The message broker 208 maintains a plurality of event queues 210A, 210B, 210C. While typically there would be one event queue 210A, 210B, 210C for each topic that a service can publish and/or subscribe to, in an example embodiment, topic A actually has two separate event queues 210A, 210B on the message broker 208, each corresponding to a different partition within topic A. Partitions and the additional technical problems introduced by use of partitions in this environment will be discussed in more detail below.

On the event handling component 202, a publish daemon 212 may publish events generated by the first service 206 to the message broker 208, and subscribing services may then be asynchronously pushed those published events, at least for topics that the subscribing services have subscribed to. Thus, for example, if another service subscribes to topic B, then an event related to topic B generated by the first service 206 is published by the publish daemon 212 to the message broker 208, which stores the event in the corresponding event queue 210C, and then the message broker 208 pushes that event to any services subscribing to topic B.

A subscribe daemon 214 can monitor incoming events for any topics subscribed to by the first service 206 (thus essentially monitoring events from any event queue for a subscribed topic).

In an example embodiment, the links between the message broker 208 and the publish daemon 212 and the subscribe daemon 214 are AMQP channels. AMQP is a framing and transfer protocol that can be used for symmetric peer-to-peer communication. It is bidirectional, and can connect an AMQP client, which may be contained in each of the publish daemon 212 and subscribe daemon 214, and the message broker 208.

The subscribe daemon 214 then manages the business events generated on topics. Once processed, the subscribe daemon 214 writes the events an inbound event queue 216, which then gets consumed by a consume daemon 218 and processed to send the events to a consumer, specifically one of the application versions 220A, 220B, 220C on the first service 206.

Tenant assignments and reassignments to and from various versions of a microservice application are handled by the tenant assignment component 222 on the consume daemon 218. The tenant assignment component 222 acts to receive such instructions from one or more users or other components and update appropriate data structures, such as tables, identifying the current tenant assignments for each version of each microservice application. A multiple microservice application version handler 223 then implements various procedures, including procedures to determine whether a rewind operation or fast-forward operation are needed, and the rewind and fast-forward operations themselves. These procedures may then be run as needed to manage such multiple versions.

An ABAP basis layer 224 may contain a daemon framework 226, which contains auto-start configurations 228 for the various daemons 212, 214, and 218. The daemon framework 226 automatically starts and/or restarts the daemons 212, 214, and 218. The auto-start configurations 228 may be created by a channel 229 in an event runtime 230.

The event runtime 230 also contains an event dispatching component 232, which receives events from a producer 234 on the first service 206 and writes those events into an outbound event queue 236, from which the events are retrieved by the publish daemon 212 for publishing on an AMQP outbound link to the message broker 208. The event dispatching component 232 further determines channels and bindings from a binding configuration 238. The binding configuration 238 also provides consumer information to the consume daemon 218 upon request.

In an example embodiment, the first service 206 provides a reconciler process that processes a configuration event and pushes a response event to the outbound event queue 236.

Referring back to the tenant assignment component 222, each time a tenant assignment change is performed, a mapping of tenants to application versions is updated and provided to all the related microservice application versions via a message broker topic. It should be noted that this mapping need not be limited to the application versions of a single microservice application, but instead the mapping may cover multiple microservice applications. For example, the mapping may indicate that tenant D is assigned to microservice application A version 1 and Application B version 2, while tenants A, B, and C are assigned to microservice application A version 2 and Application B version 3.

Multiple consumers that consume messages from the same topic in the same way may be organized as a message broker "group." Here, the groups may be segregated into a mainstream group (which includes the group used by the leader of a microservice) and a temporary group (which includes the group used by a follower of the microservice). The temporary group is called temporary since it is expected that eventually all tenants within this group will be reassigned to the mainstream group.

When a new promotion is made (a tenant is reassigned from a temporary group to a mainstream group), a series of events are produced to synchronize instances and add resiliency. These events are called "mainstream events". These events include a mainstream join, which is the event where the tenant joins the mainstream group. These events also include a mainstream update, which is an event that updates the partition state of an in-progress mainstream join. It contains a topic-partition, a mainstream join identifier, and a mainstream operation.

A mainstream operation describes the state of a mainstream join's partition. These states may include to_process, rewind, fast_forward, and done. To_process means that the partition in question needs to process the addition of a tenant. The state includes information about the offset where the last consumer group stopped consuming messages from this partition. The leader will determine to which state the partition will need to be switched to by comparing its current offset (also called the handler offset) with the offset where the follower's consumer group stopped. If the handler offset is greater, then the partition's state is switched to rewind. If it is less than or equal, then the partition's state is switched to fast-forward.

In the rewind state, the latest version has to re-process any messages in the partition from the offset of the mainstream operation (where the consumer group of the prior application version had stopped consuming) to the offset where the later version started to consume messages for the promoted tenants.

In the fast forward state, the latest version discards the messages addressed to the promoted tenants on the partition in this state from the offset where the later version started to consume messages for the promoted tenants to the offset of the mainstream operation (where the consumer group of the prior application version had stopped consuming).

Once the processing of the rewind or fast_forward state is complete, the state may be changed to done.

Figure 3:
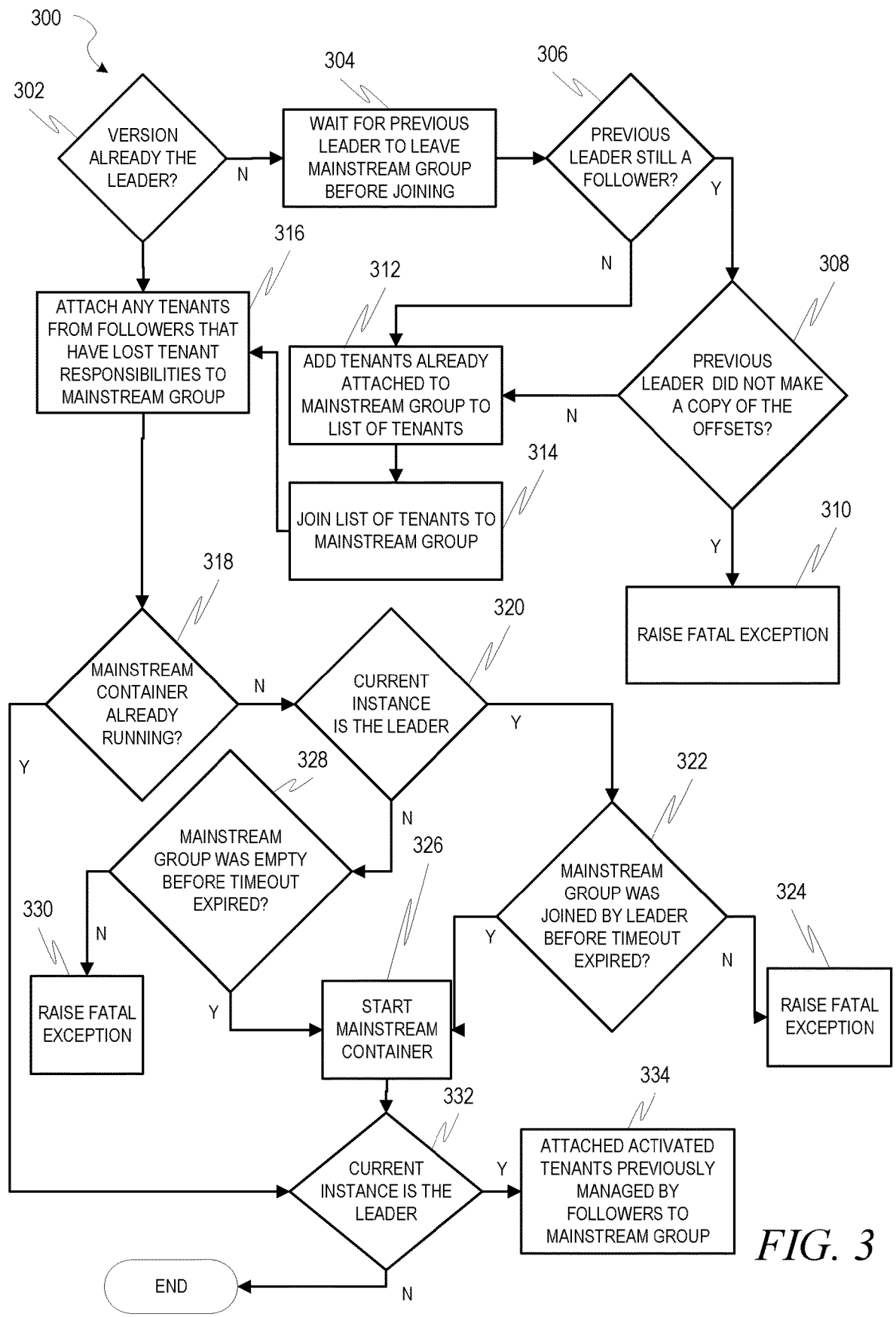
FIG. 3 is a flow diagram illustrating a method of handling a tenant assignment change by a microservice application version that is supposed to be a leader (such as one to which a tenant was reassigned) in accordance with an example embodiment.

FIG. 3 is a flow diagram illustrating a method 300 of handling a tenant assignment change by a microservice application version that is supposed to be a leader (such as one to which a tenant was reassigned) in accordance with an example embodiment. When a new mapping is received, at operation 302 it is determined if the microservice application version is already the leader. If not, then at operation 304 the microservice application version waits for the previous leader to leave the mainstream group before joining it (to avoid having two different versions subscribed to the mainstream group at the same time).

A failback procedure is then performed. At operation 306, when the consumer group is empty, it is determined if the previous leader is still active as a follower (still has some tenant responsibilities). If so, then at operation 308 it is determined whether the previous leader did not make a copy of the offsets from the mainstream group to its new temporary group (the new leader should not start consuming from the mainstream group if the previous leader left the group abnormally and did not create a copy of the offsets when it stopped consuming, as this could make the previous leader miss some messages when it comes back as the mainstream group offsets may have changed). If both operation 306 and operation 308 are determined to be true, then at operation 310, a fatal exception is raised. If either or both are determined not to be true, then the method 300 progresses to operation 312, where the tenants already attached to the mainstream group (which come from the previous leader) are added to a list of tenants whose messages are to be consumed. At operation 314, the list of tenants is joined to the mainstream group. The new leader will then be able to consume messages for any tenants attached to the mainstream group but skip messages of tenants who are not attached to the mainstream group.

Then, or if it was determined at operation 302 that the microservice application version is already the leader, at operation 316, any tenants from follower microservice application versions that have lost some tenant responsibilities are attached to the mainstream group. In an example embodiment, this may include finding the previous temporary groups, copying the offsets of each partition in the previous temporary groups, and creating a new mainstream join event sent through a topic. This mainstream join event includes instructions to ignore messages for every new tenant not attached to the mainstream group.

At operation 318 it is determined if a mainstream container is already running. If not, then at operation 320 it is determined if the current instance is the leader. If so, then at operation 322 it is determined if the mainstream group was joined by the leader instance before a timeout expired. If not, then at operation 324 a fatal exception is raised because the previous version of the microservice application didn't leave the group. If so, then at operation 326 a mainstream container is started. If at operation 320 it is determined that the current instance index is not equal to zero, then at operation 328 it is determined if the mainstream group was empty before a timeout expired. If not, then a fatal exception is raised at operation 330. If so, then the mainstream container is started at operation 326.

Once operation 326 is started, or if at operation 318 it was determined that the mainstream container was already running, then at operation 332 it is determined if the current instance is the leader. If so, then at operation 334, activated tenants previously managed by non-leader microservice application versions are attached to the mainstream group. If not, the method 300 ends.

Figure 4:
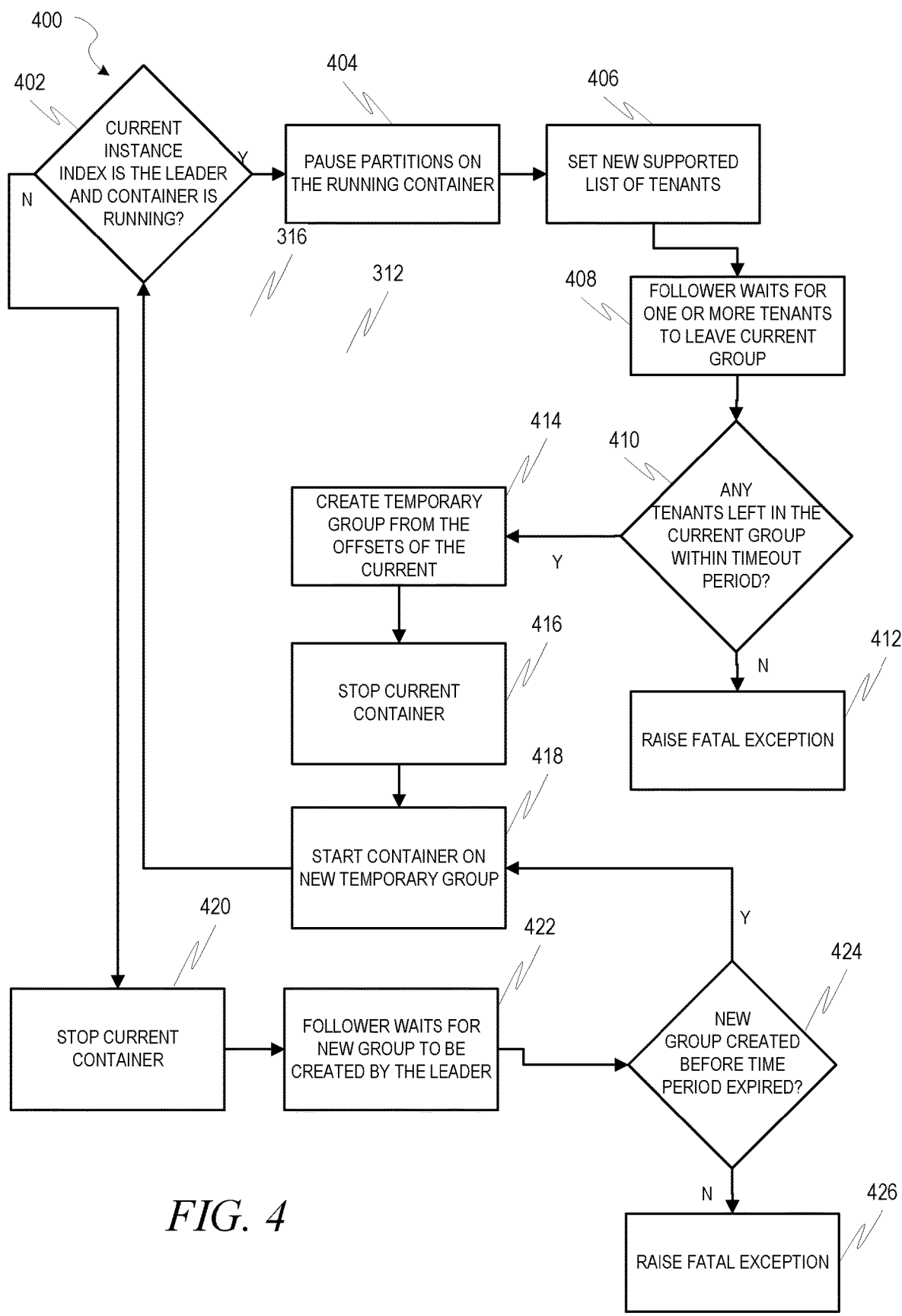
FIG. 4 is a flow diagram illustrating a method of handling a tenant assignment change by a microservice application service that is supposed to be a follower (i.e., one from which a tenant has been reassigned) in accordance with an example embodiment.

FIG. 4 is a flow diagram illustrating a method 400 of handling a tenant assignment change by a microservice application service that is supposed to be a follower (i.e., one from which a tenant has been reassigned) in accordance with an example embodiment. When a new mapping is received, at operation 402, it is determined if the current instance is the leader and a container is running. If so, then at operation 404, partitions on the running container are paused. At operation 406, a new supported list of tenants is set. Then at operation 408, the follower waits for one or more tenants to leave the current group. At operation 410, it is determined if any tenants left the current group within a timeout period. If not, then at operation 412, a fatal exception is raised because tenants did not leave the group. If so, then at operation 414 a temporary group is created from the offsets of the current (which can be the mainstream group or previous temporary group). At operation 416, the current container is stopped. Then at operation 418, a container is started on the new temporary group. The method 400 then loops to operation 402.

If at operation 402 it was determined that either the current instance index was not zero or a container was not running (or both), then at operation 420 a current container is stopped. At operation 422, the follower waits for a new group to be created by the leader. At operation 424, it is determined if the new group was created before a timeout period expires. If not, then at operation 426 a fatal exception is raised because the leader did not create the group in time. If so, then the method 400 proceeds to operation 418, where a container is started on the new temporary group.

Figure 5:
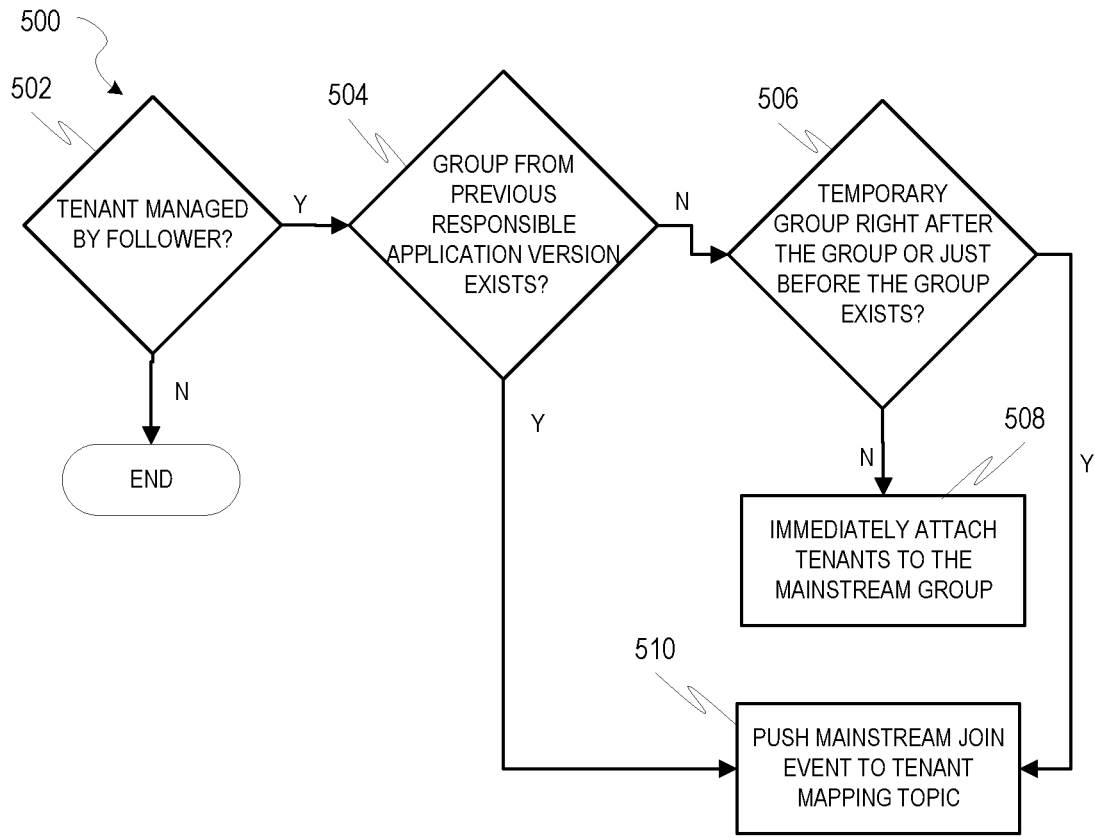
FIG. 5 is a flow diagram illustrating a method of determining a group to which to attach a tenant, as performed by a leader, in accordance with an example embodiment.

FIG. 5 is a flow diagram illustrating a method 500 of determining a group to which to attach a tenant, as performed by a leader, in accordance with an example embodiment. At operation 502, it is determined if the tenant was managed by a follower application instance. If not, then no action is necessary. If so, then at operation 504 it is determined if a group from a previous responsible application version exists. If not, then at operation 506, it is determined if the temporary group right after the group or, if none is found, just before the expected group, exists. If such a group does not exist, then at operation 508 the tenants are immediately attached to the mainstream group. If such a group does exist at operation 504 or 506, then a mainstream join event is pushed to a tenant mapping topic at operation 510.

Figure 6:
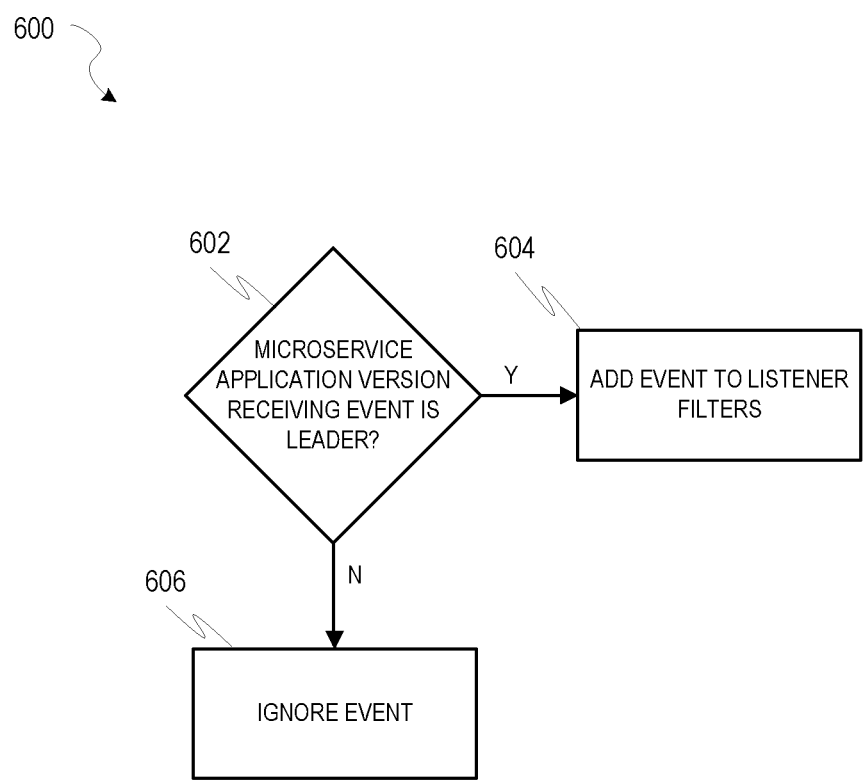
FIG. 6 is a flow diagram illustrating a method of handling a new mainstream join event in accordance with an example embodiment.

FIG. 6 is a flow diagram illustrating a method 600 of handling a new mainstream join event in accordance with an example embodiment. At operation 602, it is determined if the microservice application version receiving the event is a leader. If so, then the event is added to listener filters at operation 604. If not, then the event is ignored at operation 606, as only the leader has to attach the tenant to the mainstream group.

Figure 7:
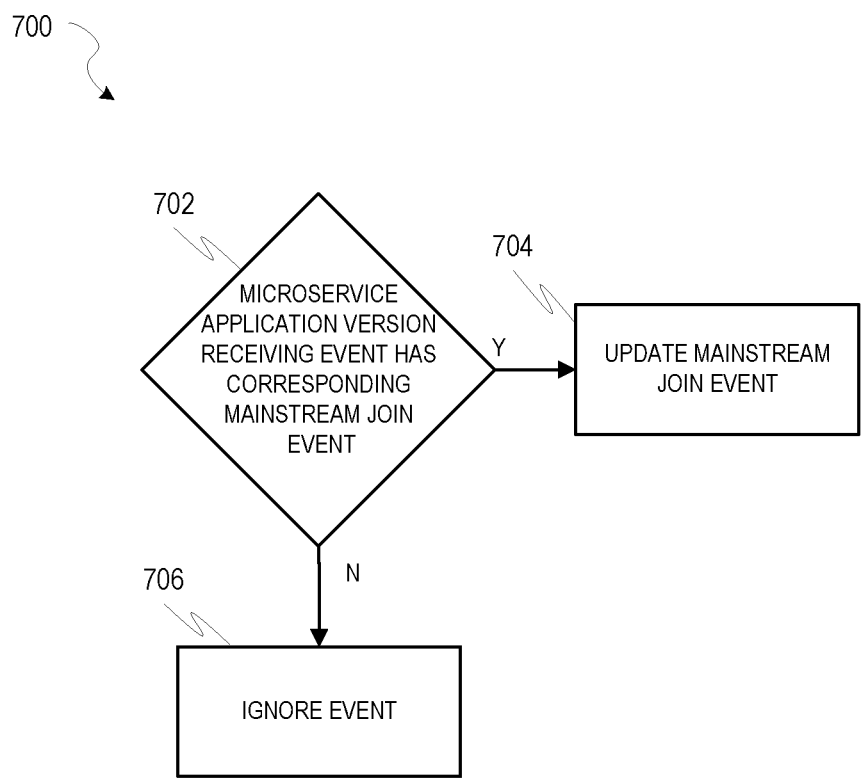
FIG. 7 is a flow diagram illustrating a method of handling a new mainstream update event, in accordance with an example embodiment.

FIG. 7 is a flow diagram illustrating a method 700 of handing a new mainstream update event, in accordance with an example embodiment. At operation 702, it is determined if the microservice application version receiving the event has a corresponding mainstream join event. If so, then at operation 704 the mainstream join event is updated. If not, then at operation 706 the event is ignored.

Figure 8:
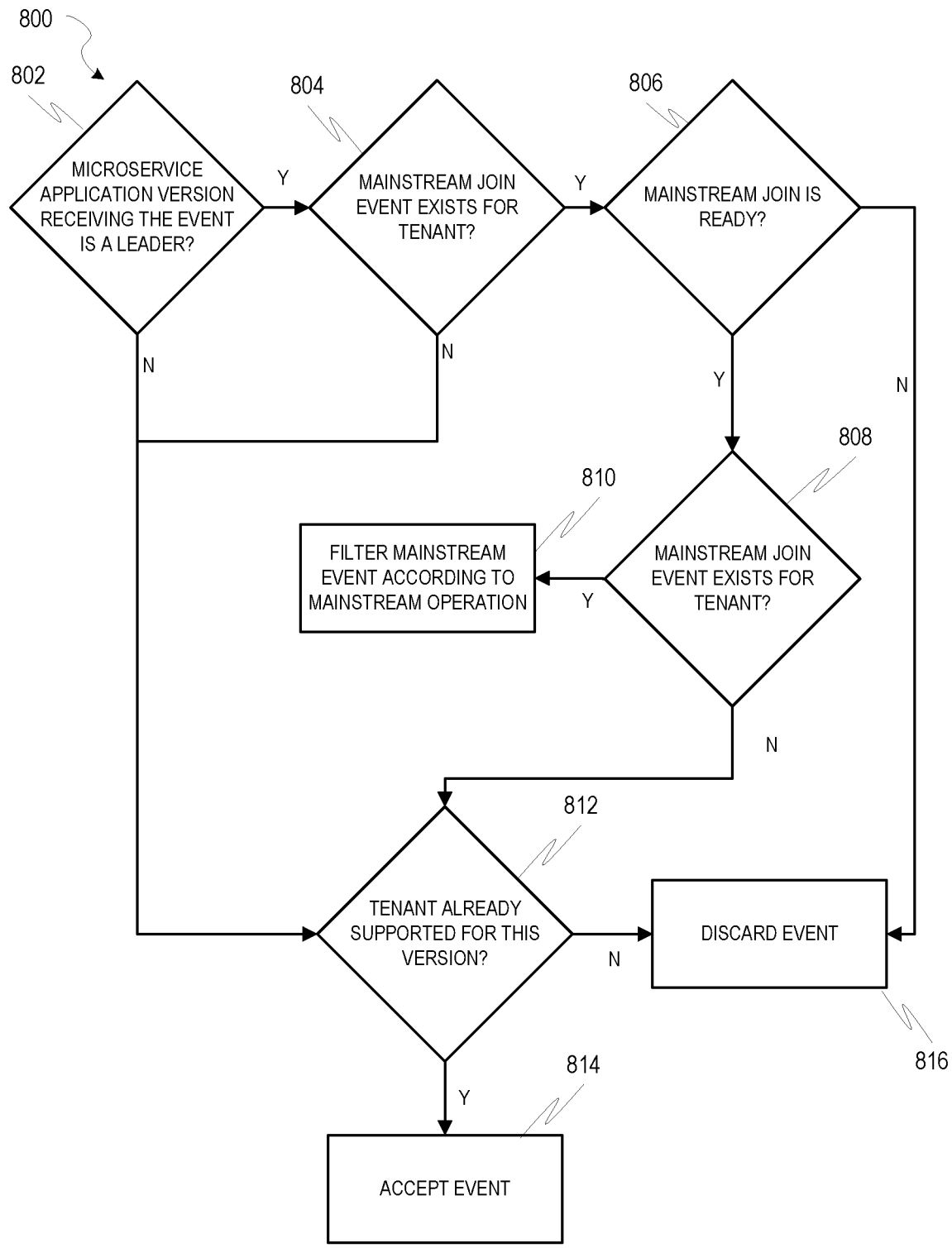
FIG. 8 is a flow diagram illustrating a method for filtering a mainstream event, in accordance with an example embodiment.

FIG. 8 is a flow diagram illustrating a method 800 for filtering a mainstream event in accordance with an example embodiment. For each message received for the topic this method 800 may be performed. At operation 802, it is determined if the microservice application version receiving the mainstream event is a leader. If so, then at operation 804 it is determined if a mainstream join event exists for the tenant. If so, then it is determined if the mainstream join is ready at operation 806. If so, then at operation 808, it is determined if the mainstream join contains a mainstream operation for the topic/partition. If so, then the mainstream event is filtered according to the mainstream operation at operation 810. If not, or if at operation 804 it was determined that a mainstream join event does not exist for the tenant, then it is determined at operation 812 whether the tenant is already supported for this microservice application version. If so, then the event is accepted at operation 814. If not, or if at operation 806 it is determined that the mainstream join is not ready, then the event is discarded at operation 816.

Figure 9:
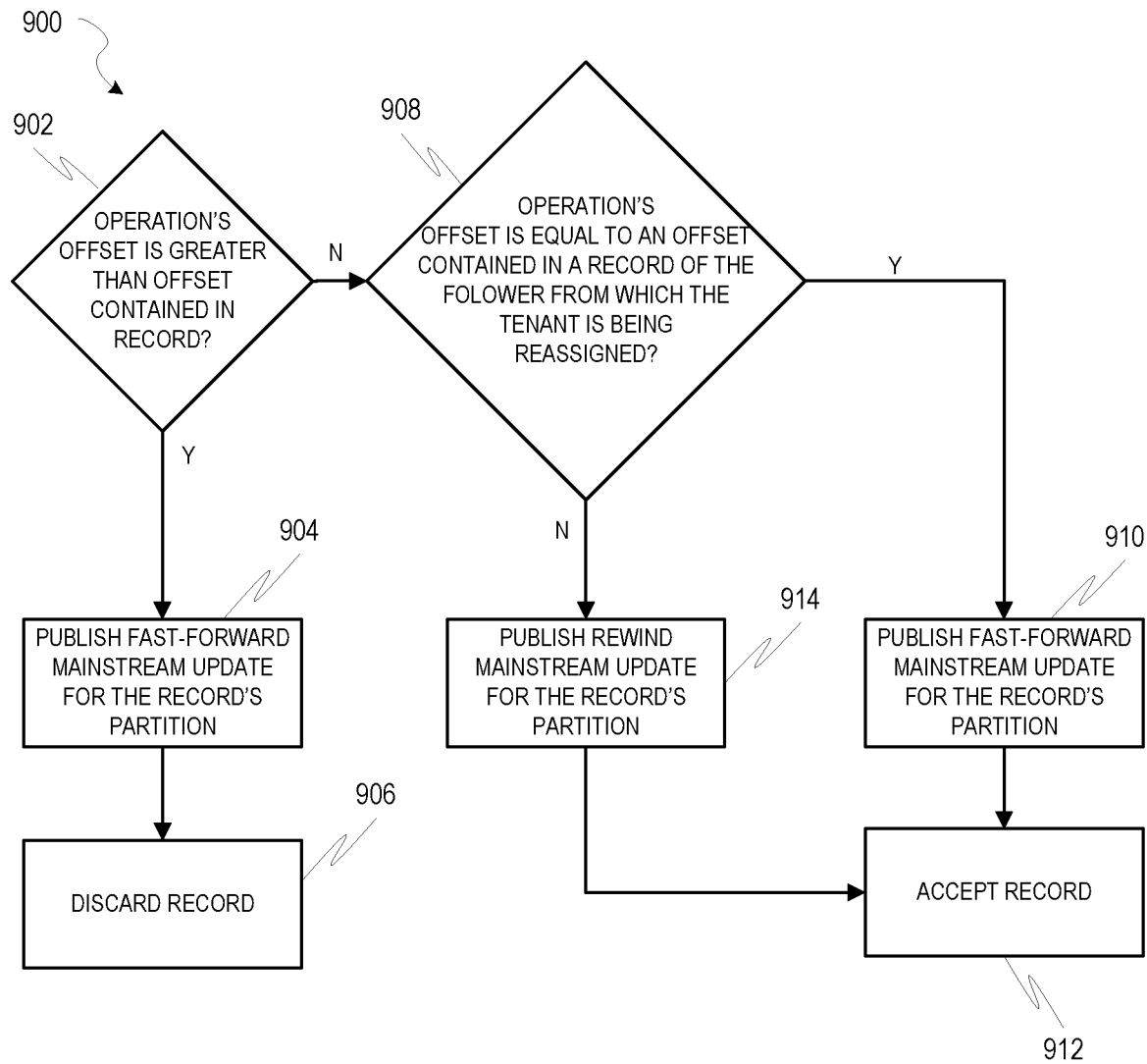
FIG. 9 is a flow diagram illustrating a method for performing a mainstream operation in a to_process state, in accordance with an example embodiment.

FIG. 9 is a flow diagram illustrating a method 900 for performing a mainstream operation in a to_process state, in accordance with an example embodiment. At operation 902, it is determined if the operation's offset is greater than an offset contained in a record corresponding to the follower from which the tenant is being reassigned. If so, then at operation 904, a fast-forward mainstream update is published for the record's partition. Then at operation 906, the record is discarded. If it is determined at operation 902 that the operation's offset is not greater than an offset contained in a record corresponding to the follower from which the tenant is being reassigned, then at operation 908 it is determined if the operation's offset is equal to an offset contained in a record corresponding to the follower from which the tenant is being reassigned. If so, then at operation 910 a fast-forward mainstream update is published for the record's partition. Then at operation 912 the record is accepted.

If at operation 908 it is determined that the operation's offset is not equal to an offset contained in a record corresponding to the follower from which the tenant is being reassigned, then at operation 914 a rewind mainstream update for the record's partition is published. Then at operation 912 the record is accepted.

In some example embodiments, instead of sending a mainstream join event with toProcess operations, toRewind is sent for the partitions to be rewound without an offset handler. A controller can then monitor and force a rewind by sending a dummy message in the partition if the rewind has not been closed after a set time period.

Each partition to be rewound can be started in different containers. As the information of each partition to be rewound comes at different times, when a microservice application version instance is ready to rewind a partition, the container is immediately started. If a rewind container already exists, then it can be stopped and a new one added by adding the new partition to be rewound. When the rewind is completed for one partition, an exception can be thrown so that instead of stopping the container, the rewound partition is paused to stop consuming from the container. The container then can be stopped when all the partitions have been rewound.

Figure 10:
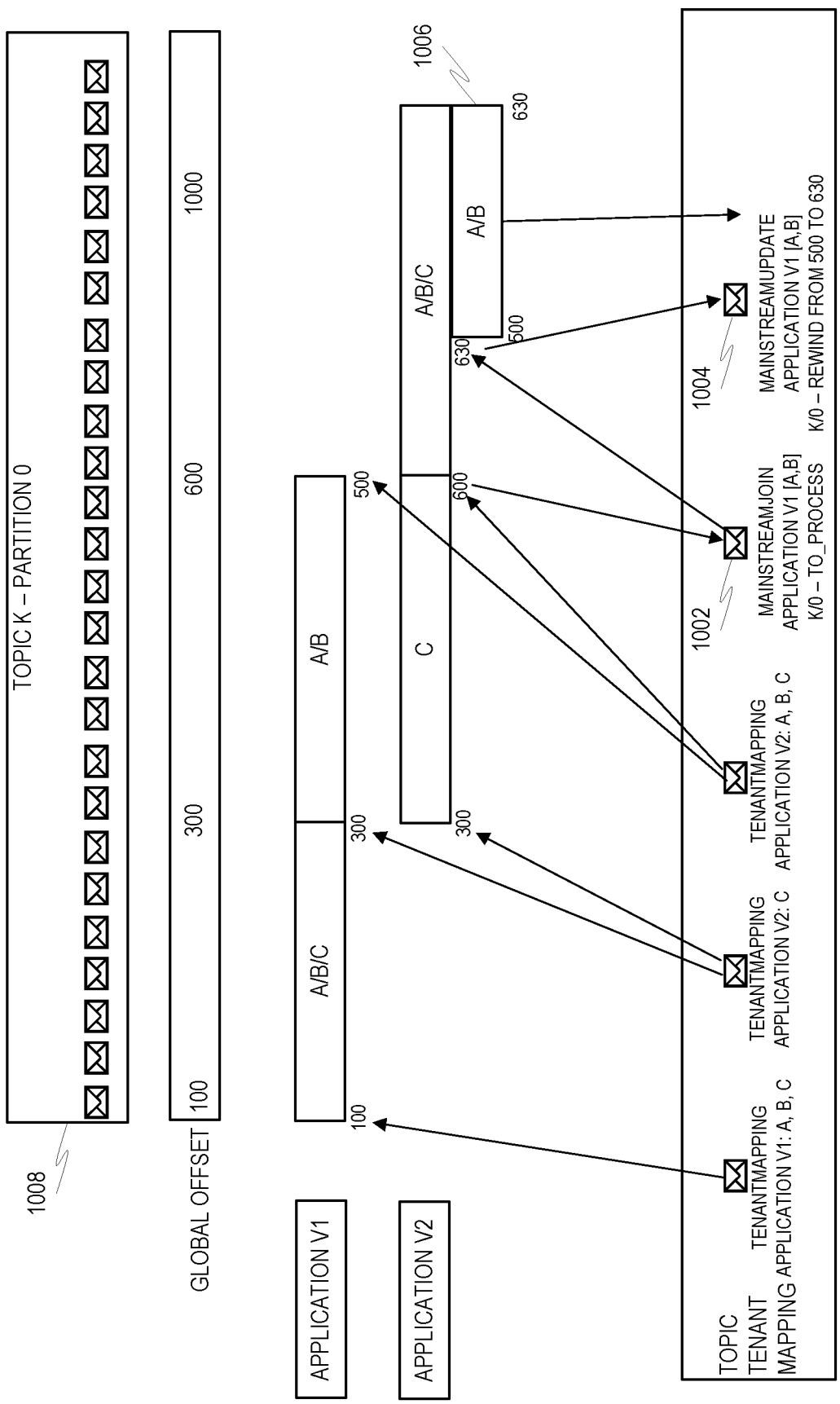
FIG. 10 is a diagram illustrating a rewind scenario, in accordance with an example embodiment.

FIG. 10 is a diagram illustrating a rewind scenario in accordance with an example embodiment. Here, at offset 100 application v1 is assigned tenants A, B, and C. At offset 300, the tenant mapping is changed so that application v2 is assigned tenant C. At offset 500, the tenant mapping is changed again so that application v2 is assigned A, B, and C. This causes application v1 to cease processing all messages at offset 500, but application v2 is running behind and only receives this instruction at offset 600. The system then creates mainstream join event 1002. There is a delay, however, between this time and when application v2 is able to generate mainstream update event 1004. Due to this delay, mainstream update event 1004 may be created with a rewind command, specifically to rewind from the time that application v1 stopped processing the messages (offset 500) and the time when application v2 is able to generate mainstream update event 1004 (offset 630). Along with the mainstream update event 1004, the records 1006 from offset 500 to offset 630 are also posted to the topic 1008.

Figure 11:
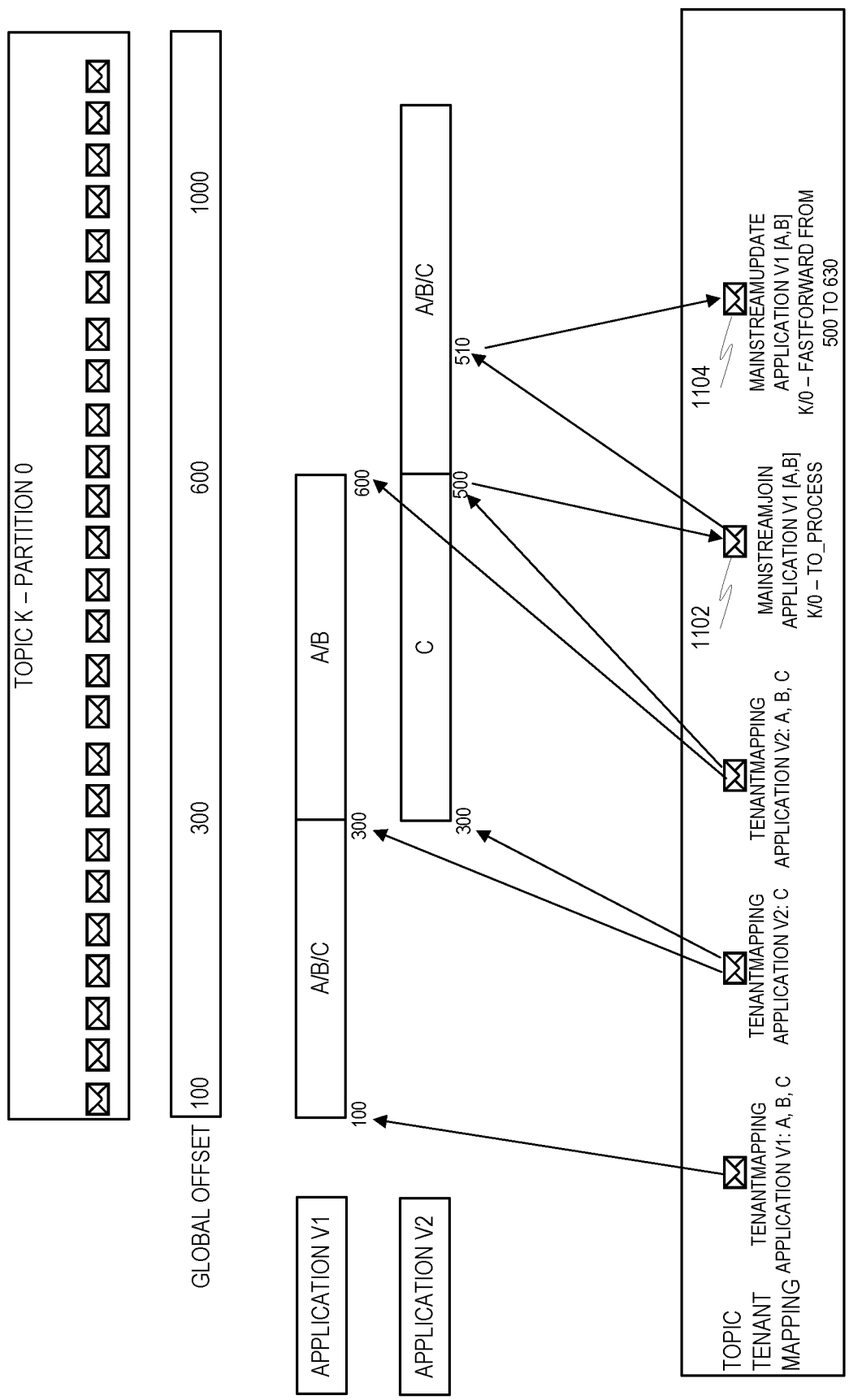
FIG. 11 is a diagram illustrating a fast-forward scenario, in accordance with an example embodiment.

FIG. 11 is a diagram illustrating a fast-forward scenario in accordance with an example embodiment. Here, at offset 100 application v1 is assigned tenants A, B, and C. At offset 300, the tenant mapping is changed so that application v2 is assigned tenant C. At offset 500, the tenant mapping is changed again so that application v2 is assigned A, B, and C. This causes application v2 to begin processing all messages at offset 500, but application v1 is behind, meaning that it does not cease processing messages for tenants A and B until offset 600.

At offset 500, application v2 creates mainstream join event 1102. This causes application v1 to cease processing all messages at offset 500. There is a delay, however, between this time and when application v2 is able to generate mainstream update event 1104 (at offset 510). The mainstream update event 1104 is therefore created with a fast-forward command, specifically to fast-forward from the time application v2 was able to generate the mainstream update event 1004 (offset 510) and the time that application v1 stopped processing the messages (offset 600).

Figure 12:
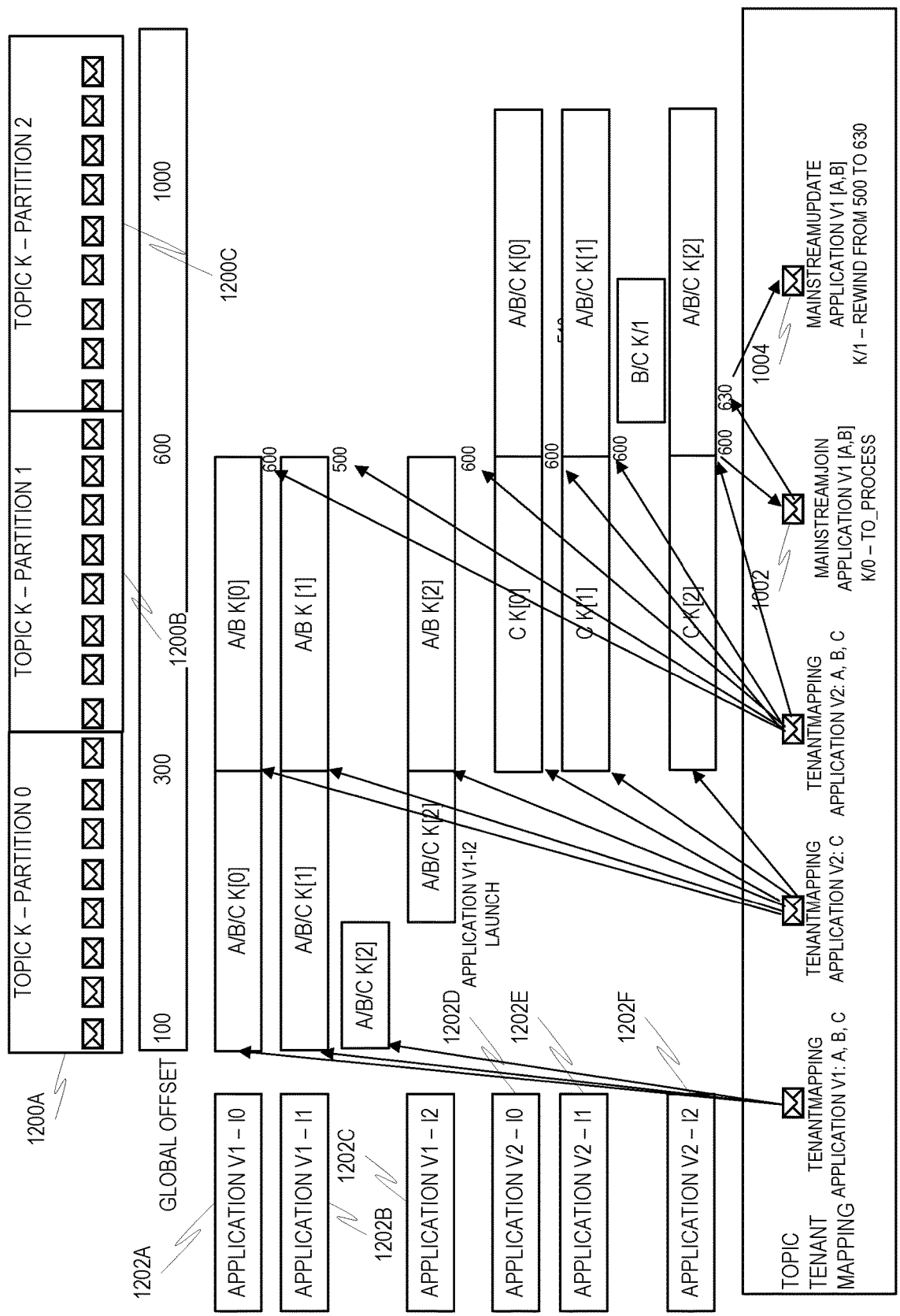
FIG. 12 is a diagram illustrating a rewind scenario in a multi-partition environment, in accordance with an example embodiment.

The above examples describe how scenarios involving a single partition are handled. In an example embodiment, however, a similar process can be applied to scenarios involving multiple partitions, such as where multiple instances of each microservice application version are running in parallel. FIG. 12 is a diagram illustrating a rewind scenario in a multi-partition environment in accordance with an example embodiment. Here, there are three partitions for topic K, specifically partition 1200A, 1200B, and 1200C. There are therefore also three instances of each microservice application version, specifically application v1 i0 1202A, application v1 i1 1202B, application v1 i2 1202C, application v2 i0 1202D, application v2 i1 1202E, and application v2 i2 1202F. Messages in prior embodiments sent to microservice application versions are sent to all instances of the microservice application versions. Each partition, however, is handled independently, and thus each set of microservice application version instances associated with each partition is handled differently.

In other words, the techniques described above with respect to rewind and fast-forward scenarios can be applied to the combination of application v1 i0 1202A and application v2 i0 1202D, and then separately applied to the combination of application v1 i1 1202B and application v2 i1 1202E, and then separately applied to the combination of application v1 i2 1202C and application v2 i2 1202F.

In view of the disclosure above, various examples are set forth below. It should be noted that one or more features of an example, taken in isolation or combination, should be considered within the disclosure of this application.

Example 1. A system comprising:
at least one hardware processor; and
a computer-readable medium storing instructions that, when executed by the at least one hardware processor, cause the at least one hardware processor to perform operations comprising:
launching a consumer daemon on a computer server, the consumer daemon forwarding messages, posted to a first topic on a message broker, for a first set of one or more tenants to a first version of a microservice application for processing and forwarding messages posted, to the first topic, for a second set of one or more tenants to a second version of the microservice application for processing;
in response to receiving an indication that a first tenant in the first set has been reassigned to the second set:
identifying a first offset at which the first version of the microservice application ceased processing messages for the first tenant, an offset being a position among messages within a first partition of the first topic;
identifying a second offset at which the second version began processing messages for the first tenant;
comparing the first offset and the second offset; and
in response to a determination that the first offset is less than the second offset, performing a rewind operation including causing the second version of the microservice application to process messages posted to the first partition of the first topic for the first tenant between the first offset and the second offset.

Example 2. The system of Example 1, wherein the operations further comprise:
in response to receiving an indication that a second tenant in the first set has been reassigned to the second set:
identifying a third offset at which the first version of the microservice application ceased processing messages for the second tenant;
identifying a fourth offset at which the second version began processing messages for the second tenant; and
in response to a determination that the first offset is greater than the second offset, performing a fast-forward operation including causing the second version of the microservice application to discard results of processed messages posted to the first partition for the first topic for the first tenant between the first offset and the second offset.

Example 3. The system of Examples 1 or 2, wherein the first version of the microservice application is a first instance of the first version of the microservice application and the second version of the microservice application is a first instance of the second version of the microservice application.

Example 4. The system of Example 3, wherein the consumer daemon forwards messages posted to a second partition of the first topic for a third set of one or more tenants to a second instance of the first version of the microservice application for processing and forwards messages posted to the second partition of the first topic for a fourth set of one or more tenants to a second instance of the second version of the microservice application for processing, and wherein the operations further comprise:
  in response to receiving an indication that a first tenant in the third set has been reassigned to the fourth set:
    identifying a third offset at which the second instance of the first version of the microservice application ceased processing messages for the first tenant in the third set;
    identifying a fourth offset at which the second instance of the second version began processing messages for the first tenant in the third set; and
    in response to a determination that the third offset is less than the fourth offset, performing a rewind operation including causing the second instance of the second version of the microservice application to process messages posted to the second partition of the first topic for the first tenant in the third set between the third offset and the fourth offset.

Example 5. The system of any of Examples 1-4, wherein a rewind container is created when the rewind operation is performed.

Example 6. The system of Example 5, wherein a different rewind container is created for each partition to be rewound.

Example 7. The system of any of Examples 1-6, wherein the identifying the first offset, identifying the second offset, and performing the rewind operation are performed by the second version of the microservice application, unless the second version of the microservice application is down, at which point another version of the microservice application performs the identifying the first offset, identifying the second offset, and performing the rewind operation.

Example 8. A method comprising:
  launching a consumer daemon on a computer server, the consumer daemon forwarding messages, posted to a first topic on a message broker, for a first set of one or more tenants to a first version of a microservice application for processing and forwarding messages posted, to the first topic, for a second set of one or more tenants to a second version of the microservice application for processing;
  in response to receiving an indication that a first tenant in the first set has been reassigned to the second set:
    identifying a first offset at which the first version of the microservice application ceased processing messages for the first tenant, an offset being a position among messages within a first partition of the first topic;
    identifying a second offset at which the second version began processing messages for the first tenant;
    comparing the first offset and the second offset; and
  in response to a determination that the first offset is less than the second offset, performing a rewind operation including causing the second version of the microservice application to process messages posted to the first partition of the first topic for the first tenant between the first offset and the second offset.

Example 9. The method of Example 8, further comprising:
  in response to receiving an indication that a second tenant in the first set has been reassigned to the second set:
    identifying a third offset at which the first version of the microservice application ceased processing messages for the second tenant;
    identifying a fourth offset at which the second version began processing messages for the second tenant; and
    in response to a determination that the first offset is greater than the second offset, performing a fast-forward operation including causing the second version of the microservice application to discard results of processed messages posted to the first partition for the first topic for the first tenant between the first offset and the second offset.

Example 10. The method of Examples 8 or 9, wherein the first version of the microservice application is a first instance of the first version of the microservice application and the second version of the microservice application is a first instance of the second version of the microservice application.

Example 11. The method of Example 10, wherein the consumer daemon forwards messages posted to a second partition of the first topic for a third set of one or more tenants to a second instance of the first version of the microservice application for processing and forwards messages posted to the second partition of the first topic for a fourth set of one or more tenants to a second instance of the second version of the microservice application for processing, and wherein the method further comprises:
  in response to receiving an indication that a first tenant in the third set has been reassigned to the fourth set:
    identifying a third offset at which the second instance of the first version of the microservice application ceased processing messages for the first tenant in the third set;
    identifying a fourth offset at which the second instance of the second version began processing messages for the first tenant in the third set; and
    in response to a determination that the third offset is less than the fourth offset, performing a rewind operation including causing the second instance of the second version of the microservice application to process messages posted to the second partition of the first topic for the first tenant in the third set between the third offset and the fourth offset.

Example 12. The method of any of Examples 8-11, wherein a rewind container is created when the rewind operation is performed.

Example 13. The method of Example 12, wherein a different rewind container is created for each partition to be rewound.

Example 14. The method of any of Examples 8-13, wherein the identifying the first offset, identifying the second offset, and performing the rewind operation are performed by the second version of the microservice application, unless the second version of the microservice application is down, at which point another version of the microservice application performs the identifying the first offset, identifying the second offset, and performing the rewind operation.

Example 15. A non-transitory machine-readable medium storing instructions which, when executed by one or more processors, cause the one or more processors to perform operations comprising:
  launching a consumer daemon on a computer server, the consumer daemon forwarding messages, posted to a first topic on a message broker, for a first set of one or more tenants to a first version of a microservice application for processing and forwarding messages posted, to the first topic, for a second set of one or more tenants to a second version of the microservice application for processing;
  in response to receiving an indication that a first tenant in the first set has been reassigned to the second set:
    identifying a first offset at which the first version of the microservice application ceased processing messages for the first tenant, an offset being a position among messages within a first partition of the first topic;
    identifying a second offset at which the second version began processing messages for the first tenant;
    comparing the first offset and the second offset; and
  in response to a determination that the first offset is less than the second offset, performing a rewind operation including causing the second version of the microservice application to process messages posted to the first partition of the first topic for the first tenant between the first offset and the second offset.

Example 16. The non-transitory machine-readable medium of Example 15, wherein the operations further comprise:
  in response to receiving an indication that a second tenant in the first set has been reassigned to the second set:
    identifying a third offset at which the first version of the microservice application ceased processing messages for the second tenant;
    identifying a fourth offset at which the second version began processing messages for the second tenant; and
    in response to a determination that the first offset is greater than the second offset, performing a fast-forward operation including causing the second version of the microservice application to discard results of processed messages posted to the first partition for the first tenant between the first offset and the second offset.

Example 17. The non-transitory machine-readable medium of Examples 15 or 16, wherein the first version of the microservice application is a first instance of the first version of the microservice application and the second version of the microservice application is a first instance of the second version of the microservice application.

Example 18. The non-transitory machine-readable medium of Example 17, wherein the consumer daemon forwards messages posted to a second partition of the first topic for a third set of one or more tenants to a second instance of the first version of the microservice application for processing and forwards messages posted to the second partition of the first topic for a fourth set of one or more tenants to a second instance of the second version of the microservice application for processing, and wherein the operations further comprise
  in response to receiving an indication that a first tenant in the third set has been reassigned to the fourth set:
    identifying a third offset at which the second instance of the first version of the microservice application ceased processing messages for the first tenant in the third set;
    identifying a fourth offset at which the second instance of the second version began processing messages for the first tenant in the third set; and
    in response to a determination that the third offset is less than the fourth offset, performing a rewind operation including causing the second instance of the second version of the microservice application to process messages posted to the second partition of the first topic for the first tenant in the third set between the third offset and the fourth offset.

Example 19. The non-transitory machine-readable medium of any of Examples 15-18, wherein a rewind container is created when the rewind operation is performed.

Example 20. The non-transitory machine-readable medium of Example 19, wherein a different rewind container is created for each partition to be rewound.

Figure 13:
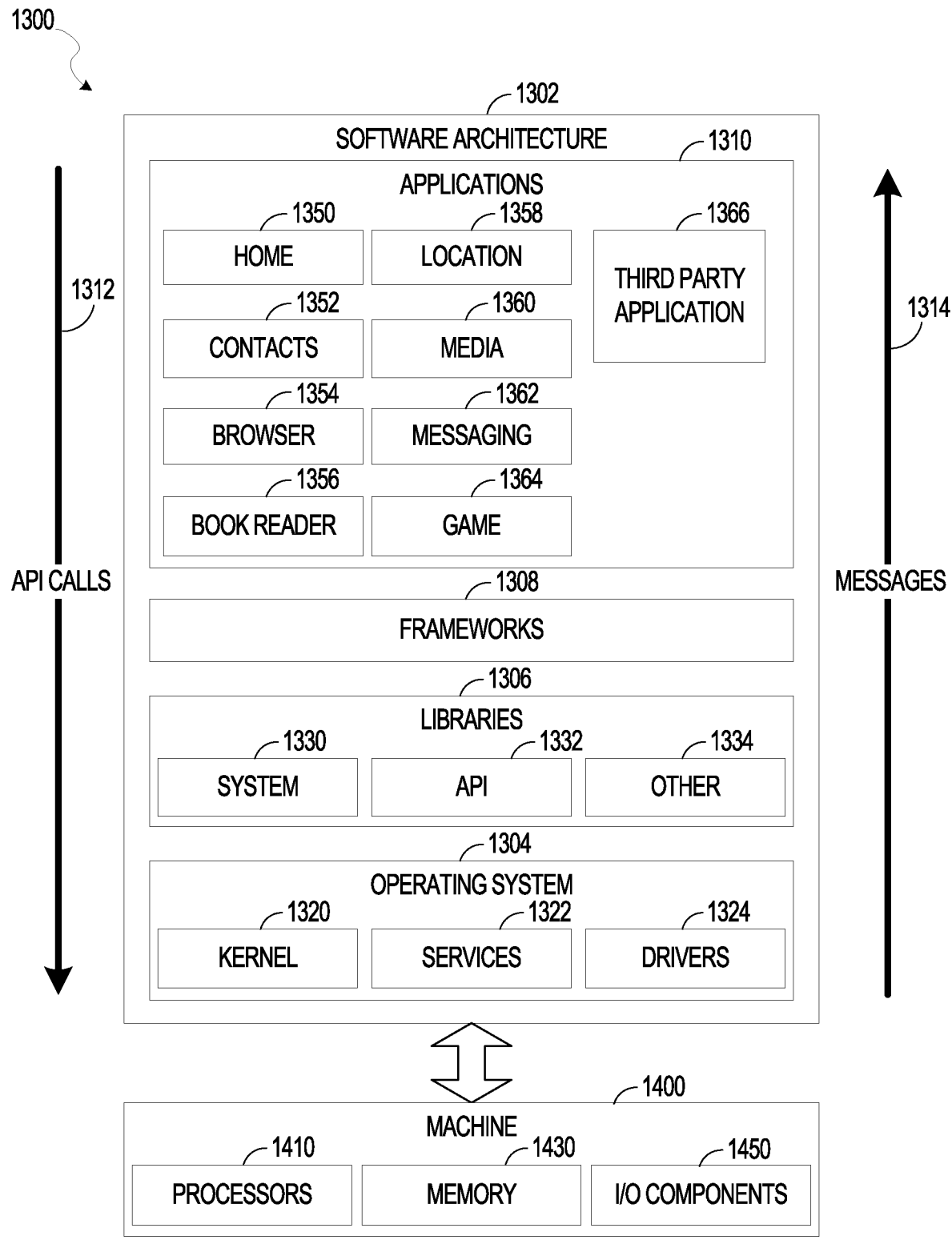
FIG. 13 is a block diagram illustrating an architecture of software, which can be installed on any one or more of the devices described above.

FIG. 13 is a block diagram 1300 illustrating a software architecture 1302, which can be installed on any one or more of the devices described above. FIG. 13 is merely a non-limiting example of a software architecture, and it will be appreciated that many other architectures can be implemented to facilitate the functionality described herein. In various embodiments, the software architecture 1302 is implemented by hardware such as a machine 1400 of FIG. 14 that includes processors 1410, memory 1430, and input/output (I/O) components 1450. In this example architecture, the software architecture 1302 can be conceptualized as a stack of layers where each layer may provide a particular functionality. For example, the software architecture 1302 includes layers such as an operating system 1304, libraries 1306, frameworks 1308, and applications 1310. Operationally, the applications 1310 invoke API calls 1312 through the software stack and receive messages 1314 in response to the API calls 1312, consistent with some embodiments.

In various implementations, the operating system 1304 manages hardware resources and provides common services. The operating system 1304 includes, for example, a kernel 1320, services 1322, and drivers 1324. The kernel 1320 acts as an abstraction layer between the hardware and the other software layers, consistent with some embodiments. For example, the kernel 1320 provides memory management, processor management (e.g., scheduling), component management, networking, and security settings, among other functionality. The services 1322 can provide other common services for the other software layers. The drivers 1324 are responsible for controlling or interfacing with the underlying hardware, according to some embodiments. For instance, the drivers 1324 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1306 provide a low-level common infrastructure utilized by the applications 1310. The libraries 1306 can include system libraries 1330 (e.g., C standard library) that can provide functions such as memory allocation functions, string manipulation functions, mathematic functions, and the like. In addition, the libraries 1306 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions and three dimensions in a graphic context on a display), database libraries (e.g., SQLite to provide various relational database functions), web libraries (e.g., WebKit to provide web browsing functionality), and the like. The libraries 1306 can also include a wide variety of other libraries 1334 to provide many other APIs to the applications 1310.

The frameworks 1308 provide a high-level common infrastructure that can be utilized by the applications 1310, according to some embodiments. For example, the frameworks 1308 provide various graphical user interface functions, high-level resource management, high-level location services, and so forth. The frameworks 1308 can provide a broad spectrum of other APIs that can be utilized by the applications 1310, some of which may be specific to a particular operating system 1304 or platform.

In an example embodiment, the applications 1310 include a home application 1350, a contacts application 1352, a browser application 1354, a book reader application 1356, a location application 1358, a media application 1360, a messaging application 1362, a game application 1364, and a broad assortment of other applications, such as a third-party application 1366. According to some embodiments, the applications 1310 are programs that execute functions defined in the programs. Various programming languages can be employed to create one or more of the applications 1310, structured in a variety of manners, such as object-oriented programming languages (e.g., Objective-C, Java, or C++) or procedural programming languages (e.g., C or assembly language). In a specific example, the third-party application 1366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1366 can invoke the API calls 1312 provided by the operating system 1304 to facilitate functionality described herein.

Figure 14:
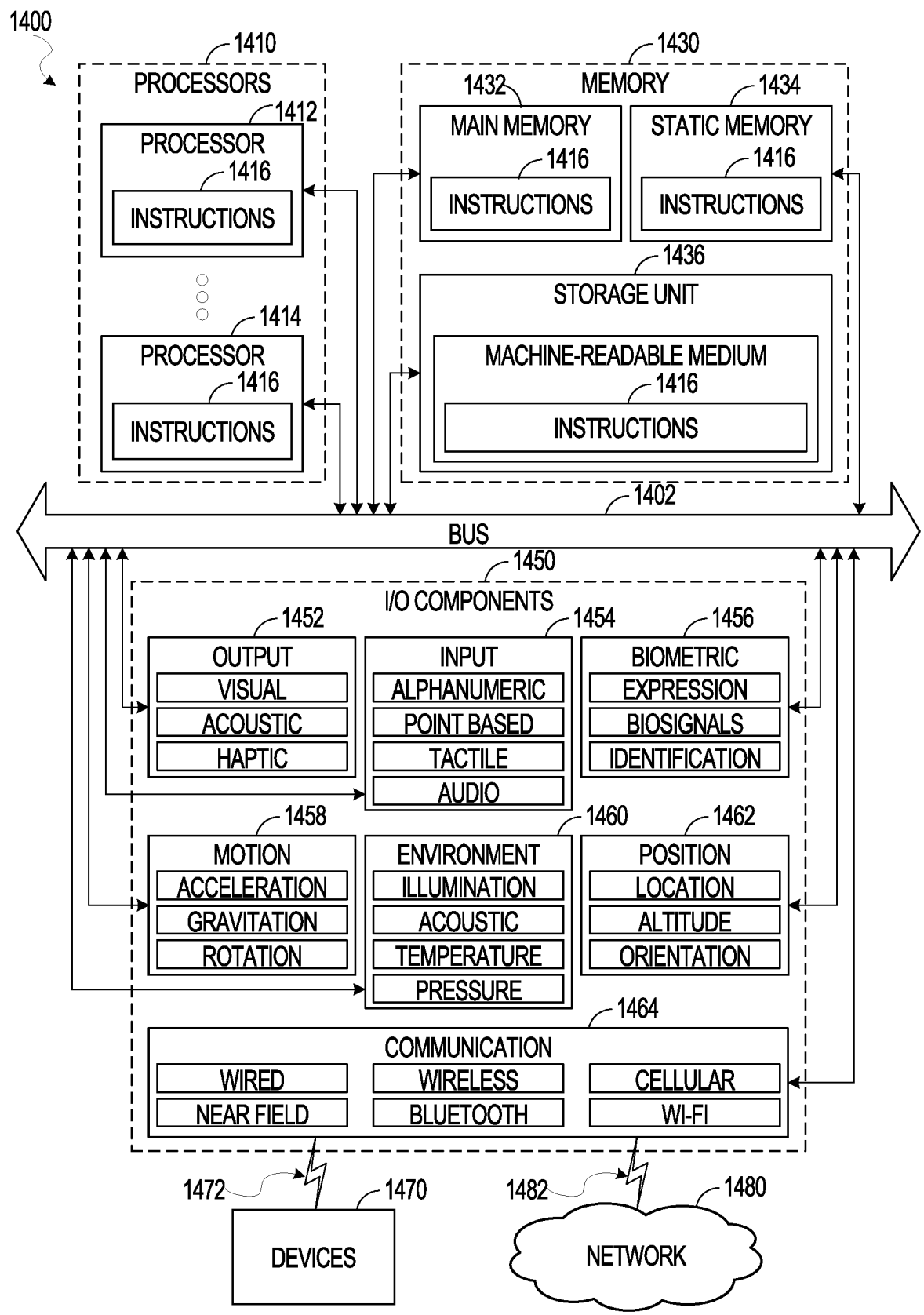
FIG. 14 illustrates a diagrammatic representation of a machine in the form of a computer system within which a set of instructions may be executed for causing the machine to perform any one or more of the methodologies discussed herein, according to an example embodiment.

FIG. 14 illustrates a diagrammatic representation of a machine 1400 in the form of a computer system within which a set of instructions may be executed for causing the machine 1400 to perform any one or more of the methodologies discussed herein, according to an example embodiment. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. For example, the instructions 1416 may cause the machine 1400 to execute the methods of FIGS. 3-9. Additionally, or alternatively, the instructions 1416 may implement FIGS. 1-12 and so forth. The instructions 1416 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory 1430, and I/O components 1450, which may be configured to communicate with each other such as via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1412 and a processor 1414 that may execute the instructions 1416. The term "processor" is intended to include multi-core processors that may comprise two or more independent processors (sometimes referred to as "cores") that may execute instructions 1416 contemporaneously. Although FIG. 14 shows multiple processors 1410, the machine 1400 may include a single processor 1412 with a single core, a single processor 1412 with multiple cores (e.g., a multi-core processor 1412), multiple processors 1412, 1414 with a single core, multiple processors 1412, 1414 with multiple cores, or any combination thereof.

The memory 1430 may include a main memory 1432, a static memory 1434, and a storage unit 1436, each accessible to the processors 1410 such as via the bus 1402. The main memory 1432, the static memory 1434, and the storage unit 1436 store the instructions 1416 embodying any one or more of the methodologies or functions described herein. The instructions 1416 may also reside, completely or partially, within the main memory 1432, within the static memory 1434, within the storage unit 1436, within at least one of the processors 1410 (e.g., within the processor's cache memory), or any suitable combination thereof, during execution thereof by the machine 1400.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion, and the grouping is in no way limiting. In various example embodiments, the I/O components 1450 may include output components 1452 and input components 1454. The output components 1452 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462, among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1462 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or another suitable device to interface with the network 1480. In further examples, the communication components 1464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., coupled via a USB).

Moreover, the communication components 1464 may detect identifiers or include components operable to detect identifiers. For example, the communication components 1464 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

The various memories (i.e., 1430, 1432, 1434, and/or memory of the processor(s) 1410) and/or the storage unit 1436 may store one or more sets of instructions 1416 and data structures (e.g., software) embodying or utilized by any one or more of the methodologies or functions described herein. These instructions (e.g., the instructions 1416), when executed by the processor(s) 1410, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., Hypertext Transfer Protocol (HTTP)). Similarly, the instructions 1416 may be transmitted or received using a transmission medium via the coupling 1472 (e.g., a peer-to-peer coupling) to the devices 1470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
      launching a consumer daemon on a computer server, the consumer daemon forwarding messages, posted to a first topic on a message broker, for a first set of one or more tenants to a first version of a microservice application for processing and forwarding messages posted, to the first topic, for a second set of one or more tenants to a second version of the microservice application for processing;
      in response to receiving an indication that a first tenant in the first set has been reassigned to the second set:
         identifying a first offset at which the first version of the microservice application ceased processing messages for the first tenant, an offset being a position among messages within a first partition of the first topic;
         identifying a second offset at which the second version began processing messages for the first tenant;
         comparing the first offset and the second offset; and
         in response to a determination that the first offset is less than the second offset, performing a rewind operation including causing the second version of the microservice application to process messages posted to the first partition of the first topic for the first tenant between the first offset and the second offset.

2. The system of claim 1, wherein the operations further comprise:
   in response to receiving an indication that a second tenant in the first set has been reassigned to the second set:
      identifying a third offset at which the first version of the microservice application ceased processing messages for the second tenant;
      identifying a fourth offset at which the second version began processing messages for the second tenant; and
      in response to a determination that the first offset is greater than the second offset, performing a fast-forward operation including causing the second version of the microservice application to discard results of processed messages posted to the first partition for the first topic for the first tenant between the first offset and the second offset.

3. The system of claim 1, wherein the first version of the microservice application is a first instance of the first version of the microservice application and the second version of the microservice application is a first instance of the second version of the microservice application.

4. The system of claim 3, wherein the consumer daemon forwards messages posted to a second partition of the first topic for a third set of one or more tenants to a second instance of the first version of the microservice application for processing and forwards messages posted to the second partition of the first topic for a fourth set of one or more tenants to a second instance of the second version of the microservice application for processing, and wherein the operations further comprise:
   in response to receiving an indication that a first tenant in the third set has been reassigned to the fourth set:
      identifying a third offset at which the second instance of the first version of the microservice application ceased processing messages for the first tenant in the third set;
      identifying a fourth offset at which the second instance of the second version began processing messages for the first tenant in the third set; and
      in response to a determination that the third offset is less than the fourth offset, performing a rewind operation including causing the second instance of the second version of the microservice application to process messages posted to the second partition of the first topic for the first tenant in the third set between the third offset and the fourth offset.

5. The system of claim 1, wherein a rewind container is created when the rewind operation is performed.

6. The system of claim 5, wherein a different rewind container is created for each partition to be rewound.

7. The system of claim 1, wherein the identifying the first offset, identifying the second offset, and performing the rewind operation are performed by the second version of the microservice application, unless the second version of the microservice application is down, at which point another version of the microservice application performs the identifying the first offset, identifying the second offset, and performing the rewind operation.

8. A method comprising:
   launching a consumer daemon on a computer server, the consumer daemon forwarding messages, posted to a first topic on a message broker, for a first set of one or more tenants to a first version of a microservice application for processing and forwarding messages posted, to the first topic, for a second set of one or more tenants to a second version of the microservice application for processing;

in response to receiving an indication that a first tenant in the first set has been reassigned to the second set:

identifying a first offset at which the first version of the microservice application ceased processing messages for the first tenant, an offset being a position among messages within a first partition of the first topic;

identifying a second offset at which the second version began processing messages for the first tenant;

comparing the first offset and the second offset; and in response to a determination that the first offset is less than the second offset, performing a rewind operation including causing the second version of the microservice application to process messages posted to the first partition of the first topic for the first tenant between the first offset and the second offset.

9. The method of claim 8, further comprising:

in response to receiving an indication that a second tenant in the first set has been reassigned to the second set:

identifying a third offset at which the first version of the microservice application ceased processing messages for the second tenant;

identifying a fourth offset at which the second version began processing messages for the second tenant; and in response to a determination that the first offset is greater than the second offset, performing a fast-forward operation including causing the second version of the microservice application to discard results of processed messages posted to the first partition for the first topic for the first tenant between the first offset and the second offset.

10. The method of claim 8, wherein the first version of the microservice application is a first instance of the first version of the microservice application and the second version of the microservice application is a first instance of the second version of the microservice application.

11. The method of claim 10, wherein the consumer daemon forwards messages posted to a second partition of the first topic for a third set of one or more tenants to a second instance of the first version of the microservice application for processing and forwards messages posted to the second partition of the first topic for a fourth set of one or more tenants to a second instance of the second version of the microservice application for processing, and wherein the method further comprises:

in response to receiving an indication that a first tenant in the third set has been reassigned to the fourth set:

identifying a third offset at which the second instance of the first version of the microservice application ceased processing messages for the first tenant in the third set;

identifying a fourth offset at which the second instance of the second version began processing messages for the first tenant in the third set; and in response to a determination that the third offset is less than the fourth offset, performing a rewind operation including causing the second instance of the second version of the microservice application to process messages posted to the second partition of the first topic for the first tenant in the third set between the third offset and the fourth offset.

12. The method of claim 8, wherein a rewind container is created when the rewind operation is performed.

13. The method of claim 12, wherein a different rewind container is created for each partition to be rewound.

14. The method of claim 8, wherein the identifying the first offset, identifying the second offset, and performing the rewind operation are performed by the second version of the microservice application, unless the second version of the microservice application is down, at which point another version of the microservice application performs the identifying the first offset, identifying the second offset, and performing the rewind operation.

15. A non-transitory machine-readable medium storing instructions which, when executed by one or more processors, cause the one or more processors to perform operations comprising:

launching a consumer daemon on a computer server, the consumer daemon forwarding messages, posted to a first topic on a message broker, for a first set of one or more tenants to a first version of a microservice application for processing and forwarding messages posted, to the first topic, for a second set of one or more tenants to a second version of the microservice application for processing;

in response to receiving an indication that a first tenant in the first set has been reassigned to the second set:

identifying a first offset at which the first version of the microservice application ceased processing messages for the first tenant, an offset being a position among messages within a first partition of the first topic;

identifying a second offset at which the second version began processing messages for the first tenant;

comparing the first offset and the second offset; and in response to a determination that the first offset is less than the second offset, performing a rewind operation including causing the second version of the microservice application to process messages posted to the first partition of the first topic for the first tenant between the first offset and the second offset.

16. The non-transitory machine-readable medium of claim 15, wherein the operations further comprise:

in response to receiving an indication that a second tenant in the first set has been reassigned to the second set:

identifying a third offset at which the first version of the microservice application ceased processing messages for the second tenant;

identifying a fourth offset at which the second version began processing messages for the second tenant; and in response to a determination that the first offset is greater than the second offset, performing a fast-forward operation including causing the second version of the microservice application to discard results of processed messages posted to the first partition for the first topic for the first tenant between the first offset and the second offset.

17. The non-transitory machine-readable medium of claim 15, wherein the first version of the microservice application is a first instance of the first version of the microservice application and the second version of the microservice application is a first instance of the second version of the microservice application.

18. The non-transitory machine-readable medium of claim 17, wherein the consumer daemon forwards messages posted to a second partition of the first topic for a third set of one or more tenants to a second instance of the first version of the microservice application for processing and forwards messages posted to the second partition of the first topic for a fourth set of one or more tenants to a second instance of the second version of the microservice application for processing, and wherein the operations further comprise:
    in response to receiving an indication that a first tenant in the third set has been reassigned to the fourth set:
        identifying a third offset at which the second instance of the first version of the microservice application ceased processing messages for the first tenant in the third set;
        identifying a fourth offset at which the second instance of the second version began processing messages for the first tenant in the third set; and
        in response to a determination that the third offset is less than the fourth offset, performing a rewind operation including causing the second instance of the second version of the microservice application to process messages posted to the second partition of the first topic for the first tenant in the third set between the third offset and the fourth offset.

19. The non-transitory machine-readable medium of claim 15, wherein a rewind container is created when the rewind operation is performed.

20. The non-transitory machine-readable medium of claim 19, wherein a different rewind container is created for each partition to be rewound.

* * * * *